July 4, 1933. W. T. HONISS 1,916,666
METHOD OF AND APPARATUS FOR SUPPLYING GLASS TO SUCTION MACHINES
Filed Sept. 10, 1931 2 Sheets-Sheet 1
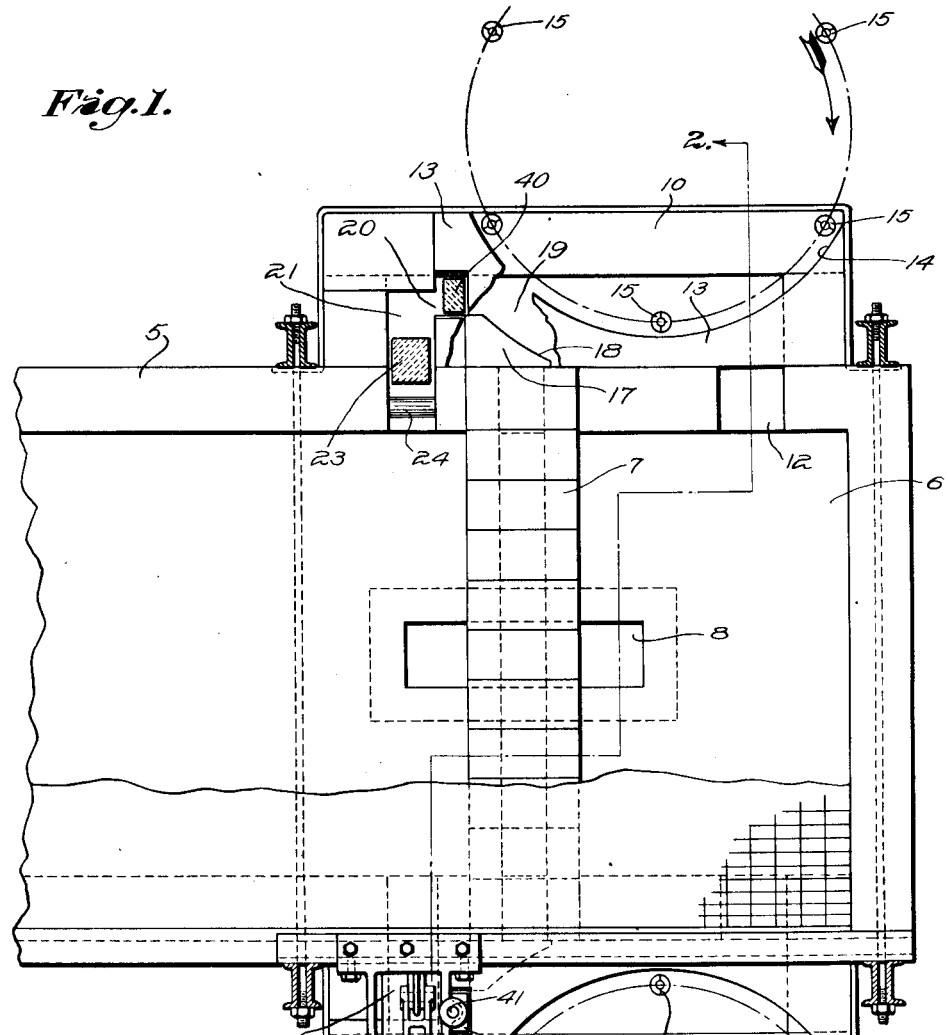
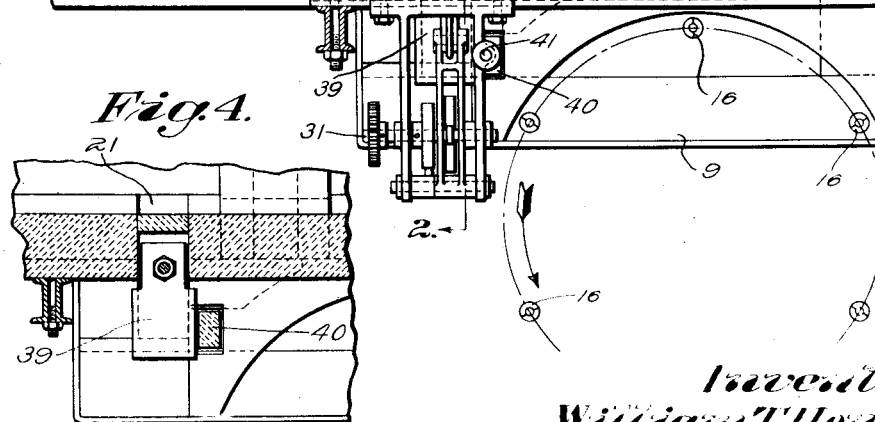
Inventor;
William T. Honiss
by Brown + Parham
Attorneys July 4, 1933.                    W. T. HONISS                     1,916,666
           METHOD OF AND APPARATUS FOR SUPPLYING GLASS TO SUCTION MACHINES
                        Filed Sept. 10, 1931           2 Sheets-Sheet 2

Witness:
W. B. Thayer

Inventor:
William T. Honiss
by Brown + Parham
Attorneys

Patented July 4, 1933

1,916,666

UNITED STATES PATENT OFFICE

WILLIAM T. HONISS, OF WEST HARTFORD, CONNECTICUT, ASSIGNOR TO HARTFORD-EMPIRE COMPANY, OF HARTFORD, CONNECTICUT, A CORPORATION OF CONNECTICUT

METHOD OF AND APPARATUS FOR SUPPLYING GLASS TO SUCTION MACHINES

Application filed September 10, 1931. Serial No. 562,072.

This invention relates to the supplying of glass to suction machines and to the maintaining of such glass in proper condition for fabrication into glass articles by the suction method.

The general object of the invention is to provide novel apparatus and a novel method by the employment of which glass of good quality may be constantly supplied to a suction machine from a pool in a stationary container, instead of from a rotary pot such as heretofore extensively used in practicing the suction method.

Although various arrangements already have been proposed for supplying molten glass to suction machines from a stationary container, many of them have inadequately met either or both of the requirements that the chilled glass produced in the gathering operations must be wholly removed from the gathering zone, and such glass afterwards so treated as to be completely melted and reassimilated by the main body of glass before it can possibly return to the gathering zone.

Consequently, the apparatus and methods heretofore devised for supplying glass to suction machines from a stationary container, usually have been unsuitable for use with suction machines operating at high speeds where a highly efficient and reliable disposition of the chilled glass produced by gathering is most essential.

It is a further object of this invention to provide a novel method and a novel apparatus which will fulfill the above and other requirements for high speed, suction gathering operations. This object is attained by the provision of a melting tank suitably separated into a melting chamber and a tempering chamber (often referred to in this art as the refining chamber) having one or more bays for the supply of glass to one or more suction machines, and particularly characterized by the provision of a channel leading directly from a gathering bay to the melting end portion of the tank. Thus, the chilled glass produced in gathering, may be removed from the gathering zone or pool and discharged into the melting end of the tank wherein the highest temperature is usually maintained, positively assuring the maintenance of fresh homogeneous glass in the gathering pool. By returning such chilled glass to the melting end of the tank, it must of necessity be completely melted and heated to the temperature of the main body of glass even before flowing into the refining chamber, so that there is little if any risk of contaminating the glass in the gathering pool.

Other objects of the invention will be pointed out in the detailed description thereof which follows, or will become apparent from such description.

In order that the invention may more clearly be understood and its various advantages appreciated, reference should be had to the accompanying drawings in which a convenient embodiment thereof is illustrated.

In said drawings:

Figure 1 is a view in horizontal sectional top plan of the forward portion of a glass melting tank embodying the invention and taken substantially on the line 1—1 of Fig. 2;

Fig. 4 is a detail view in horizontal section of a fragmentary part of the construction shown in Fig. 2, and taken substantially on the line 4—4 of Fig. 2.

Referring in detail to the drawings, the melting end portion of the glass tank is indicated at 5, separated from the tempering end portion or chamber 6 by a bridge wall 7 of suitable construction. Supply glass flows from the melting end or chamber to the tempering chamber through the submerged throat 8.

Formed on the opposite sides of the forward portion of the tank are the extensions or bays 9 and 10.

The arrangement of the oppositely extending bays 9 and 10 forms a symmetrical construction which insures a relatively uniform heat balance in the tank, that being desirable for efficient operation.

These bays and apparatus associated therewith, may be identical in construction and hence a description of one will suffice for both.

Each bay extends lengthwise of the tank forwardly from a point to the rear of the bridge wall 7. The purpose of this arrangement is hereinafter explained.

Figure 2:
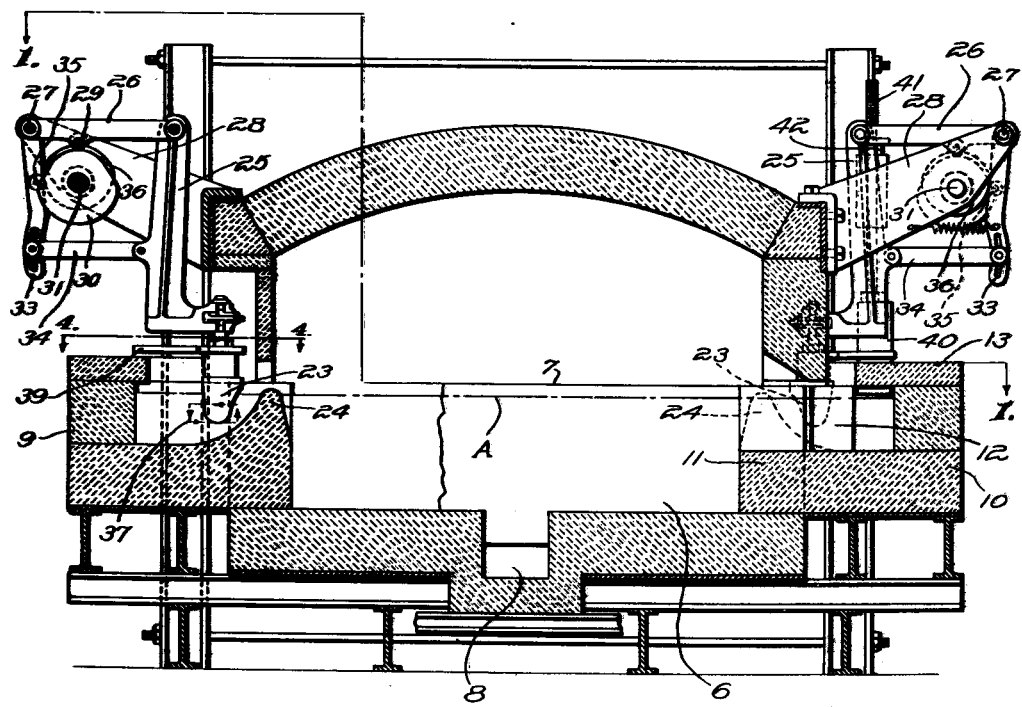
Fig. 2 is a view in transverse vertical section of the construction shown in Fig. 1, and taken substantially on the line 2—2 of Fig. 1.

As shown in Fig. 2, the floor 11 of the extension 10 is raised above the floor of the chamber 6. This reduces the depth of glass in the extension 10, which glass flows into the extension through the channel 12.

The extension is partially enclosed by a cover block 13 suitably cut away as indicated at 14 for access of molds 15 of a suction machine to the surface of the glass in the extension. It will be understood that the molds 15, as well as molds 16 associated with the extension 9 may be parts of suction machines of well-known type forming per se no part of the present invention.

Located in the rear part of the chamber of extension 10 is a channel block 17 having a curved outer face 18 which provides a channel 19 diminishing in width rearwardly of the extension to where it joins with the channel 20, which in turn leads into a transverse channel 21. The channel 21 opens into the front portion of the melting chamber rearwardly of the bridge wall as is clearly shown in Fig. 1. Thus the channels 19, 20 and 21 provide a passageway in the extension 10 from the chamber thereof, around the bridge wall, and into the melting chamber.

The passageway thus provided serves to conduct glass from the gathering pool in the extension 10 into the melting chamber. In order to insure the flow of glass through the passageway at a sufficient speed to efficiently remove chilled glass in the gathering pool, and discharge it into the melting chamber, and also to induce the flow of fresh homogeneous glass from chamber 6 through channel 12 into the gathering pool, a mechanical glass circulator of suitable form preferably is associated with the passageway.

Figure 3:
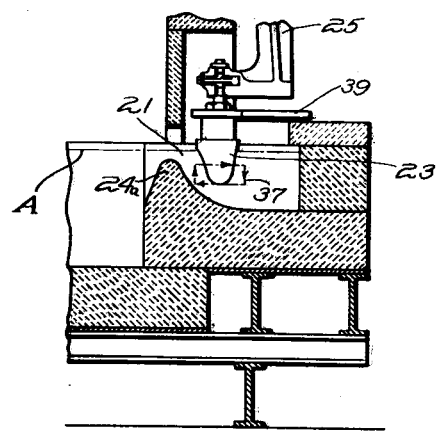
Fig. 3 is a detail view in vertical section of a fragmentary part of a construction such as shown in Figs. 1 and 2, but illustrating a modification thereof.

In the construction shown in the drawings, a paddle or impeller 23 is supported for operation in channel 21. The paddle 23 is located for cooperation with a dam 24 in channel 21, and arranged between the paddle and the melting chamber, as shown in Figs. 1, 2 and 3. Dam 24 preferably extends above the metal line A (Fig. 2) but if desired, a dam may be employed the top of which is somewhat below the metal line as shown at 24a, Fig. 3.

The paddle 23 is operated by suitable mechanism to discharge glass over the dam into the melting chamber, the dam serving to prevent the return flow of such glass from the melting chamber to the channel 21.

The paddle 23 may be supported by a link 25, pivoted at its upper end to a lever 26, fulcrumed at 27 in the bracket 28. Lever 26 carries a roller 29 engaging a cam 30 on cam shaft 31 driven by suitable means not shown, the cam thus serving to raise and lower the paddle at appropriate times.

In similar manner, the paddle is moved horizontally at appropriate times by a vertical lever 33 connected by link 34 to the supporting link 25, as shown in Fig. 2. Lever 33 carries a cam roller 35 which rides on cam 36, likewise mounted on and driven by shaft 31.

The construction for operating the paddle 23 may be substantially identical with that disclosed in the patent to Karl E. Peiler, No. 1,721,487, granted July 16, 1929, and per se forms no part of the present invention.

Suffice to say that such mechanism serves to move the paddle 23 in a vertical rectangular path indicated at 37, Figs. 2 and 3, the forward movement of the paddle in a horizontal direction toward the dam being materially more rapid than the rearward horizontal movement thereof. It will be obvious that such actuation of the paddle will serve to circulate the glass into the gathering pool from the tempering chamber, and to discharge a stream of glass entraining the chilled glass produced by gathering operation, from the gathering pool into the melting chamber.

The escape of heat from channel 21 around the paddle 23 is substantially prevented by a plate 39 movable with the paddle and closing the opening through which the paddle extends into the channel, at all times.

Likewise, the escape of heat from the melting chamber through channel 20 into the gathering pool is restricted by a gate 40 carried by screw-threaded rod 41, extending through bracket 28. A nut 42 serves to adjust gate 40 to shut off or regulate the passage of heat from the melting chamber into and through channel 21 above the glass therein.

The circulation effected by the paddle or impeller may be assisted by the revolution or movement of the molds 15 in contact with the glass in a direction generally lengthwise of the tank and toward the rear thereof, the molds 15 being revolved in a clockwise direction as indicated by the arrow, Fig. 1. Furthermore, it is desirable to rotate the molds in the direction stated, so that the bits or tails of glass severed from the charges gathered in the molds, will be deposited at the rear of the gathering pool, and at the remotest point from the inlet channel 12, to insure rapid and immediate removal thereof from the gathering zone, and to prevent their being sucked up by succeeding molds.

The circulative effect of the impeller 23 may be rendered particularly strong by the relatively shallow depth of the gathering pool, inasmuch as such shallowness of the pool prevents or tends to prevent the chilled bits formed in gathering, from settling to the bottom of the tank where they might be beyond the range of the drawing force of the impeller. However, it will be understood that the depth of the gathering pool may be appreciably greater than illustrated in the drawings without materially impairing the operation of the apparatus, and without departing from the invention.

The molds 16 associated with the extension 9 preferably are revolved in counterclockwise direction to assist the discharge of glass from the rear of the extension or gathering pool, and to cause the bits formed in severing to be deposited as remotely as possible from the supply inlet to the pool. This will be understood from the preceding description of the preferred operation of the molds associated with the extension 10.

Although the invention has been illustrated for use with rotary glass forming machines, it is not limited to such use but also may be employed for supplying glass to one or more molds of a machine of the reciprocating, or other type, and various changes may be made in the details of construction of the apparatus and in the method described without departing from the scope of the appended claims.

The term "melting chamber", as used herein and in the claims, means that portion of the usual continuous glass tank rearwardly of the bridge wall, into which portion the batch is introduced and where actual melting takes place at the highest temperature in the tank for the conversion of the batch to glass. The term "refining chamber" or "tempering chamber" denotes that portion of the usual continuous tank forwardly of the bridge wall, into which portion the molten glass flows directly from the "melting chamber" through the throat or submerged channel in the bridge wall. In this portion of the tank, the glass is tempered and homogenized for delivery into one or more bays or forehearths, from which in turn the glass is delivered to one or more shaping machines.

Having thus described my invention, what I desire to claim and secure by Letters Patent is:

1. The method of maintaining a pool of molten glass from the surface of which charges of glass may be gathered by suction, which comprises melting the glass in one chamber of a glass tank, conducting the glass from the melting chamber to a tempering chamber connected therewith, supplying glass from the tempering chamber to a gathering pool, and causing a direct return flow of glass in molten condition from the gathering pool into the melting chamber, without passing through the tempering chamber.

2. The method of maintaining a pool of glass for suction gathering and of gathering glass in molds from the surface of the pool, which comprises melting the glass in the melting chamber of a glass tank, conducting the melted glass into a tempering chamber of the said tank, supplying glass from the tempering chamber to a gathering pool, gathering charges in molds from the surface of the pool, causing a direct return flow of glass from the gathering pool to the melting chamber without passing through the tempering chamber, and moving the molds during the gathering operation, in contact with the surface of the glass in the gathering pool and in a direction to assist the flow of glass from the gathering pool to the melting chamber.

3. A glass tank comprising a melting chamber and a tempering chamber, a bridge wall separating said chambers, an extension formed on said tank for containing a pool of glass from the surface of which charges may be gathered by suction, a passageway directly connecting the pool and the melting chamber and extending around the bridge wall, and means for effecting forced circulation of glass from the tempering chamber into and through the extension and thence through said passageway directly into said melting chamber.

4. A glass melting tank comprising melting and tempering chambers separated by a bridge wall, a gathering chamber, a glass conducting channel between the tempering chamber and the gathering chamber, and a passageway directly connecting the gathering chamber and the melting chamber for the direct return flow of glass from the gathering chamber into the melting chamber.

5. A glass melting tank comprising melting and tempering chambers separated by a transverse bridge wall, an extension formed on the side of said tank, said extension reaching from a point in front of the bridge wall, to a point to the rear thereof, means for conducting glass in the tempering chamber into the extension to provide a gathering pool, and means constituting a passageway for the direct return flow of glass from the extension into the melting chamber.

6. A glass melting tank comprising melting and tempering chambers separated by a bridge wall, opposed bays extending in opposite directions from the sides of said tank, each of said bays reaching from a point in front of the bridge wall to a point to the rear thereof, and means for supplying glass to said bays from the tempering chamber, and for discharging glass from said bays into the melting chamber.

Signed at Hartford, Connecticut this 8th day of September 1931.

WILLIAM T. HONISS.